United States Patent
Kuo et al.

(10) Patent No.: US 10,263,444 B2
(45) Date of Patent: Apr. 16, 2019

(54) TWO WAY CHARGING-DISCHARGING CIRCUIT STRUCTURE

(71) Applicant: Quanta Computer Inc., Taoyuan (TW)

(72) Inventors: Hsin-Chih Kuo, Taoyuan (TW); Kuo-Hsien Lee, Taoyuan (TW)

(73) Assignee: QUANTA COMPUTER INCORPORATED, Taoyuan (TW)

( * ) Notice: Subject to any disclaimer, the term of this patent is extended or adjusted under 35 U.S.C. 154(b) by 87 days.

(21) Appl. No.: 15/485,575

(22) Filed: Apr. 12, 2017

(65) Prior Publication Data

US 2018/0205237 A1    Jul. 19, 2018

(30) Foreign Application Priority Data

Jan. 18, 2017  (TW) .............. 106101742 A

(51) Int. Cl.
*H02J 7/00* (2006.01)
*H02J 7/02* (2016.01)

(52) U.S. Cl.
CPC .............. *H02J 7/0054* (2013.01); *H02J 7/02* (2013.01); *H02J 2007/006* (2013.01); *H02J 2007/0062* (2013.01)

(58) Field of Classification Search
USPC ....................................................... 320/112
See application file for complete search history.

(56) References Cited

U.S. PATENT DOCUMENTS

| 8,975,871 B2 | 3/2015 | Hsu et al. | |
| 2006/0284595 A1* | 12/2006 | Hsieh | H02J 7/0077 320/115 |

FOREIGN PATENT DOCUMENTS

TW        201249065 A    12/2012

OTHER PUBLICATIONS

Office Action issued in corresponding Taiwan patent application dated Aug. 15, 2017.

* cited by examiner

*Primary Examiner* — Samuel Berhanu
(74) *Attorney, Agent, or Firm* — McClure, Qualey & Rodack, LLP

(57) ABSTRACT

A two way charging-discharging circuit structure has a main system and a secondary system. When the main system is connected to the secondary system, the sequence for discharging the battery modules may be controlled, and the to-be-discharging battery module will not be charged. The battery modules of the main system and the secondary system may be charged simultaneously if the power of the power adapter is large enough.

10 Claims, 9 Drawing Sheets

TWO WAY CHARGING-DISCHARGING CIRCUIT STRUCTURE

CROSS-REFERENCE TO RELATED APPLICATION

This application claims priority from Taiwan Patent Application No. 106101742 filed on Jan. 18, 2017 at the Taiwan Intellectual Property Office, the content of which is hereby incorporated by reference in its entirety for all purposes.

BACKGROUND OF THE INVENTION

1. Field of the Invention

The present disclosure relates to a two way charging-discharging circuit structure, and, more specifically, relates to a two way charging-discharging circuit structure which utilizes the power supply mechanism of the USB Type-C (USB-C) connector system so as to avoid mutual charging between the main system and the dock system.

2. Description of the Related Art

Generally speaking, 2-in-1 detachable laptop/tablet hybrid computers may be separated into two parts, the main system and the dock system. When these two parts are in a combined configuration, the two parts must attach physically and connect so that data transfer and, in general, power transfer may be possible between the two parts. Therefore, desirable and advantageous would be a connector connecting the main system and the dock system via a single USB-C connector, such that, while in battery-charging mode (AC Mode), a charger may charge the batteries of the main system and dock system and also supply electricity to the two systems, and, while in battery-discharging mode (DC Mode), the batteries of the main system and dock system may supply electricity, if necessary via the USB-C connector, to the two systems, while avoiding mutual charging between the batteries of the main system and dock system.

SUMMARY OF THE INVENTION

A simplified summary of one or more embodiments is presented below to provide a basic understanding of the techniques of the present disclosure. This summary is not a detailed or complete description of every imaginable embodiment illustrating the techniques encompassed by the present disclosure, is not meant to identify critical or important elements of all embodiments, nor is it meant to define the scope of any or every aspect of the techniques of the present disclosure. The only purpose of the summary presented below is to introduce main concepts of one or more embodiments in a simplified way as a prelude to a more detailed description which follows further below.

The purpose of the present invention is to provide a two way charging-discharging circuit structure, including a main system and a secondary system. The main system includes a main system circuit, a first charging-discharging circuit, a main system battery module, a first USB-C connector, a first power adapter and a first comparator circuit. The main system circuit includes a main system power-receiving terminal. The first charging-discharging circuit includes a first power-supplying terminal, a first power-receiving terminal, a first control terminal and a first charging-discharging terminal, wherein the first power-supplying terminal is connected to the main system power-receiving terminal. The main system battery module is connected to the first charging-discharging terminal. The first USB-C connector is connected to the first power-receiving terminal via a first power delivery controller circuit. The first power adapter has a first terminal and a second terminal, wherein the first terminal is connected to the first power-supplying terminal and the second terminal is connected to the first power delivery controller circuit. The first comparator circuit is connected between the first power-receiving terminal and the first control terminal. The secondary system includes a secondary system circuit, a second charging-discharging circuit, a secondary system battery module, a second USB-C connector, a third USB-C connector, a second power adapter and a second comparator circuit. The secondary system circuit has a secondary system power-receiving terminal. The second charging-discharging circuit has a second power-supply terminal, a second power-receiving terminal, a second control terminal and a second charging-discharging terminal, wherein the second power-supply terminal is connected to the secondary system power-receiving terminal. The secondary system battery module is connected to the second charging-discharging terminal. The second USB-C connector is connected to the second power-receiving terminal via a second power delivery controller circuit. The third USB-C connector is connected to the second power-receiving terminal via a third power delivery controller circuit. The second power adapter has a third terminal and a fourth terminal, wherein the third terminal is connected to the second power-supplying terminal and the fourth terminal is connected to the second power delivery controller circuit. The second comparator circuit is connected between the second power-receiving terminal and the second control terminal. Besides, the first USB-C connector may be selectively connected to the second USB-C connector.

In accordance with the two way charging-discharging circuit structure provided in the present disclosure, which has the following advantages:

1. Due to the usage of USB-C connectors to connect the main system and the secondary system, customizing new connectors is not necessary so as to reduce the cost.

2. The two way charging-discharging circuit structure may control the discharging order of batteries when the two way charging-discharging circuit structure is in the connected state, in the main or secondary system battery discharging mode, and the to-be-discharging battery will not be charged.

3. When the two way charging-discharging circuit structure is in a battery charging mode, the battery modules of the main system and secondary system may be charged simultaneously if the power from the power adapter is sufficient. On the other hand, the charging priority of main system battery module is higher than that of secondary system battery module if the power from the power adapter is insufficient.

BRIEF DESCRIPTION OF THE DRAWINGS

Each of the exemplified aspects of present disclosure will be more specifically described in the following "DESCRIPTION OF THE PREFERRED EMBODIMENTS", the "CLAIMS" thereafter, and the appended drawings, wherein:

DESCRIPTION OF THE PREFERRED EMBODIMENTS

The present disclosure describes a two way charging-discharging circuit structure. Each aspect of the techniques of the present disclosure will be described with reference to the appended drawings. In order to explicitly explain the present disclosure, the following content will describe many specific details so as to provide a thorough understanding of one or more aspects of the present disclosure. However, obviously, the techniques of the present disclosure may still be achieved without these specific details. Exemplary structures and configurations are presented in the form of block diagrams to facilitate the description of these aspects of present disclosure.

Figure 1:
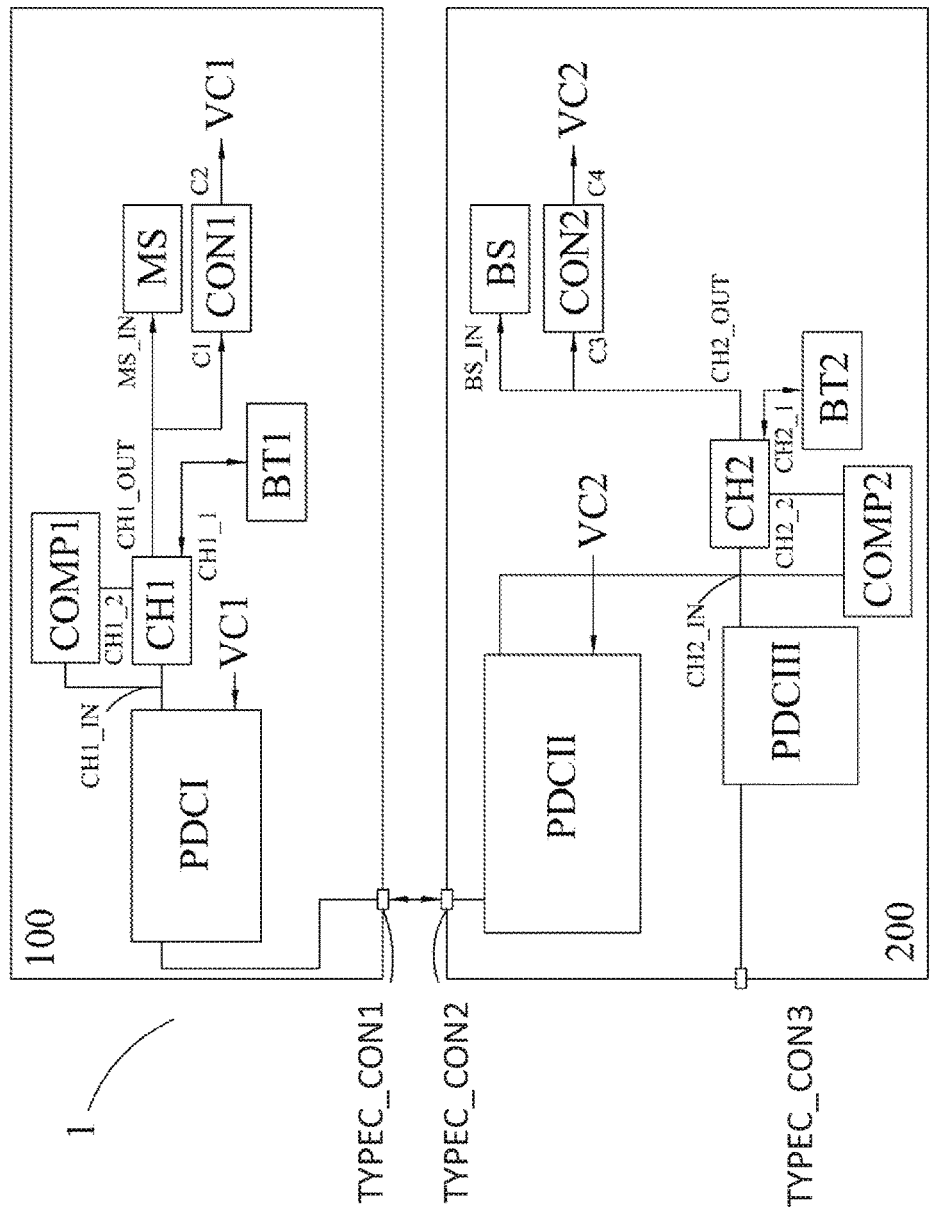
FIG. 1 is a circuit layout diagram of the two way charging-discharging circuit structure according to the first embodiment of the present disclosure.

Please refer to FIG. 1, which is a circuit layout diagram of the two way charging-discharging circuit structure 1 according to the first embodiment of the present disclosure. As illustrated in FIG. 1, it provides a two way charging-discharging circuit structure 1, which includes a main system 100 and a secondary system 200. The main system 100 includes a main system circuit MS, a first charging-discharging circuit CH1, a main system battery module BT1, a first USB-C connector TYPEC_CON1, a first power adapter CON1 and a first comparator circuit COMP1.

The main system circuit MS has a main system power-receiving terminal MS_IN. The first charging-discharging circuit CH1 has a first power-supplying terminal CH1_OUT, a first power-receiving terminal CH1_IN, a first control terminal CH1_2 and a first charging-discharging terminal Ch1_1, wherein the first power-supplying terminal CH1_OUT is connected to the main system power-receiving terminal MS_IN. The main system battery module BT1 is connected to the first charging-discharging terminal CH1_1. The first USB-C connector TYPEC_CON1 is connected to the first power-receiving terminal CH1_IN via a first power delivery controller circuit PDCI. Wherein, due to benefit from the high-powered property of USB-C interface, the fast charging may be achieved, and supplying power to bigger apparatuses such as laptop, monitor and television may also be achieved. An USB-C cable includes a configuration channel (CC), which may be utilized to discover, configure and manage an advanced power delivery function of USB-C, so as to achieve the advanced power delivery function of providing up to 100 W for remote-configured or mobile devices. Except for the UFP (upstream-facing port) and the DFP (Downstream-Facing Port) defined in the latest USB standard, the regulation of USB-C further defines the DRP (dual-role port). The new-type USB data port may also be competent to carry out working conducted by any one of both the DFP and UFP. Besides, the DRP may be permanently configured as the DFP or UFP, and also be capable of dynamic switching between the two types of ports described above.

In addition, the first power adapter CON1 has a first terminal C1 and a second terminal C2, wherein the first terminal C1 is connected to the first power-supplying terminal CH1_OUT, and the second terminal C2 is connected to the first power delivery controller circuit PDCI (a first converting voltage VC1). The first comparator circuit COMP1 is connected between the first power-receiving terminal CH1_IN and the first control terminal CH1_2.

The secondary system includes a second circuit BS, a second charging-discharging circuit CH2, a secondary system battery module BT2, a second USB-C connector TYPEC_CON2, a third USB-C connector TYPEC_CON3, a second power adapter CON2 and a second comparator circuit COMP2. In this case, the main system 100 and the secondary system 200 may respectively be the main system and the dock system of 2-in-1 detachable laptop/tablet hybrid computers. Generally speaking, the dock system may include a keyboard, a touch panel, an extension connection port as well as a power connection port, and may be configured with one or more processors to conduct the power management and the signal processing thereof. In the appended drawings, for the purpose of convenient explanations, each circuit is presented in a form of block diagram, but not excluding the hardware, software, firmware and circuit elements therein which may carry out their corresponding functions.

The secondary system circuit BS has a secondary system power-receiving terminal BS_IN. The second charging-discharging circuit CH2 has a second power-supplying terminal CH2_OUT, a second power-receiving terminal CH2_IN, a second control terminal CH2_2 and a second charging-discharging terminal CH2_1, wherein the second power-supplying terminal CH2_OUT is connected to the secondary system power-receiving terminal BS_IN. The secondary system battery module BT2 is connected to the second charging-discharging terminal CH2_1. Wherein, the serial-connected numbers of the battery modules of main system BT1 and secondary system BT2 may be one to four series.

The second USB-C connector TYPEC_CON2 is connected to the second power-receiving terminal CH2_IN via a second power delivery controller circuit PDCII. The third USB-C connector TYPEC_CON3 is connected to the second power-receiving terminal CH2_IN via a third power delivery controller circuit PDCIII. The second power adapter CON2 has a third terminal C3 and a fourth terminal C4, wherein the third terminal C3 is connected to the second power-supplying terminal CH2_OUT, and the fourth terminal C4 is connected to the second power delivery controller circuit PDCII (a second converting voltage VC2). The second comparator circuit COMP2 is connected between the second power-receiving terminal CH2_IN and the second control terminal CH2_2. Wherein, the first USB-C connector TYPEC_CON1 may be selectively connected to the second USB-C connector TYPEC_CON2. For example, the first USB-C connector TYPEC_CON1 and the third USB-C connector TYPEC_CON3 may be the female joint and the second USB-C connector TYPEC_CON2 may be the male joint. According to user habits, the main system 100 may be independently used, connected to the power adapter (AC power) for charging, connected to the secondary system 200 so as to utilize the secondary system battery module BT2 for electricity supplying, or connecting the third USB-C connector TYPEC_CON3 to the power adapter so as to charge the main system battery module BT1 and the secondary system battery module BT2 when in the connected state with the secondary system 200. Besides, the second USB-C connector TYPEC_CON2 may be the female joint, but not limited to be the female joint only.

Figure 2:
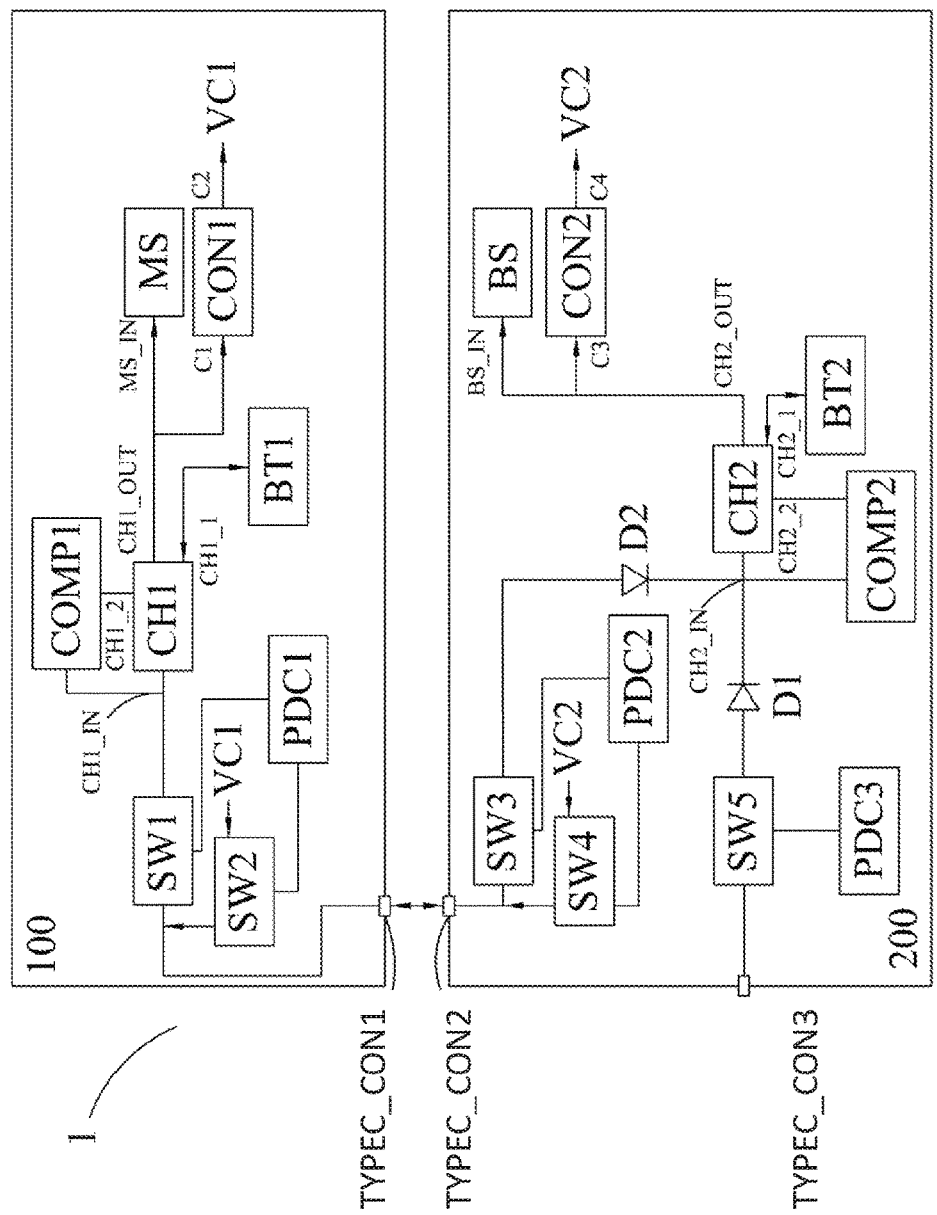
FIG. 2 is a circuit layout diagram of the two way charging-discharging circuit structure according to the second embodiment of the present disclosure.

In order to more explicitly explain the two way charging-discharging circuit structure of the present disclosure, please refer to the FIG. 2, which is a circuit layout diagram of the two way charging-discharging circuit structure 1 according to the second embodiment of the present disclosure. Wherein, details of the first power delivery controller circuit PDCI, the second power delivery controller circuit PDCII and the third power delivery controller circuit PDCIII are more explicitly illustrated. As illustrated in FIG. 2, the first power delivery controller circuit PDCI and the second power delivery controller circuit PDCII respectively include at least two switch devices and a DRP-type power delivery controller, and the third power delivery controller circuit PDCIII includes at least one switch device and an UFP-type power delivery controller.

Explicitly speaking, the first power delivery controller circuit PDCI includes a first power delivery controller PDC1, a first switch SW1 and a second switch SW2. The first switch SW1 is connected between the first power-receiving terminal CH1_IN and the first USB-C connector TYPEC_CON1, and a control terminal of the first switch SW1 is connected to the first power delivery controller PDC1. The second switch SW2 is connected between the first USB-C connector TYPEC_CON1 and the first power delivery controller PDC1, and configured to be controlled by the first power delivery controller PDC1, so as to allow or prohibit the passing of the first converting voltage VC1 provided by the first power adapter CON1.

On the other hand, the second power delivery controller circuit PDCII includes a second power delivery controller PDC2, a second diode D2, a third switch SW3 and a fourth switch SW4. Wherein, the third switch SW3 is connected to the second power-receiving terminal CH2_IN via the second diode D2, and connected to the second USB-C connector TYPEC_CON2, wherein a control terminal of the third switch SW3 is connected to the second power delivery controller PDC2. The fourth switch SW4 is connected between the second USB-C connector TYPEC_CON2 and the second power delivery controller PDC2, and configured to be controlled by the second power delivery controller PDC2, so as to allow or prohibit the passing of the second converting voltage VC2 provided by the second power adapter CON2.

Furthermore, the third power delivery controller circuit PDCIII includes a fifth switch SW5, a third power delivery controller PDC3 and a first diode D1. Wherein, a terminal of the fifth switch SW5 is connected to the second power-receiving terminal CH2_IN via the first diode D1, and the other terminal of the fifth switch SW5 is connected to the third USB-C connector TYPEC_CON3. A control terminal of the fifth switch SW5 is connected to the third power delivery controller PDC3, and configured to be controlled by the third power delivery controller PDC3, so as to allow or prohibit the passing of current which is provided by the third USB-C connector TYPEC_CON3.

On the basis of FIG. 2 of the present disclosure, multiple operating modes of the two way charging-discharging circuit structure 1 of the present disclosure will be sequentially and explicitly described, such as the main system battery discharging mode, main system battery charging mode, secondary system battery discharging mode, secondary system battery charging mode, secondary system battery discharging mode in the connected state, main system battery discharging mode in the connected state and charging mode in the connected state.

Figure 3:
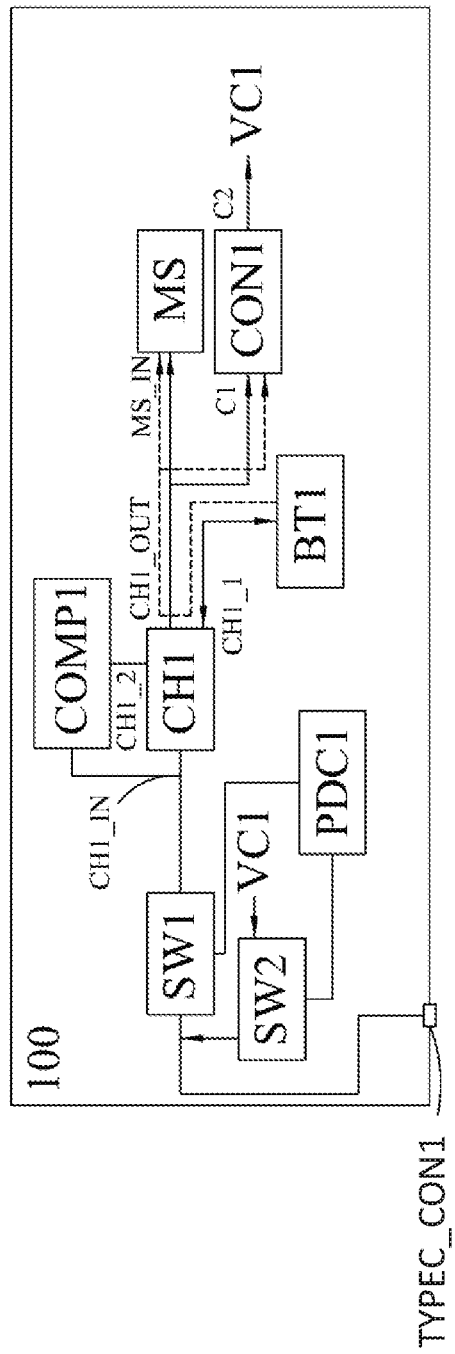
FIG. 3 is a schematic diagram showing the electricity supply path when in the main system battery discharging mode according to an embodiment of the present disclosure.

Please refer to FIG. 3, which is a schematic diagram showing the electricity supply path when in the main system battery discharging mode according to an embodiment of the present disclosure. As illustrated in FIG. 3, it shows the operating principle of main system 100 only in DC mode. During the main system only in DC mode, the first USB-C connector TYPEC_CON1 is not connected to the second USB-C connector TYPEC_CON2; the main system battery module BT1 supplies electricity to the first charging-discharging circuit CH1; and the first charging-discharging circuit CH1 generates the main system supply voltage so as to drive the main system circuit MS. In this mode, the main system battery module BT1 may supply electricity to the main system circuit MS, and generating the first converting voltage VC1 via the first power adapter CON1, wherein the electricity supply path of main system battery module is illustrated as the dotted lines in FIG. 3. In the meantime, the first converting voltage VC1 may preferably be 17V (which does not have specific effects in this mode, and details thereof will be further described below), but not limited to be 17V only. In this mode, since the first power delivery controller PDC1 detects that the first USB-C connector TYPEC_CON1 is not connected to a connector, power adapter ADP or external device, the first switch SW1 is in the OFF state.

Figure 4:
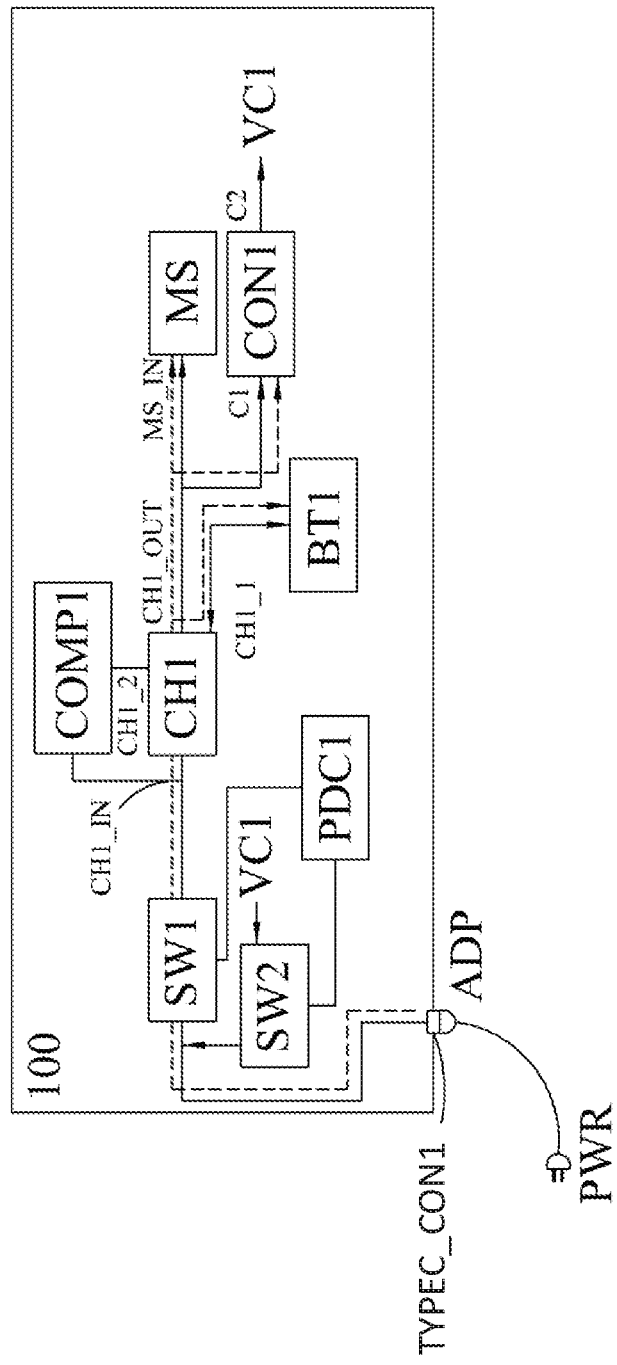
FIG. 4 is a schematic diagram showing the electricity supply path when in the main system battery charging mode according to an embodiment of the present disclosure.

Please refer to FIG. 4, which is a schematic diagram showing the electricity supply path when in the main system battery charging mode according to an embodiment of the present disclosure. When in the main system battery charging mode, the first USB-C connector TYPEC_CON1 is not connected to the second USB-C connector TYPEC_CON2, but connected to the power adapter ADP of the power source PWR. When the first power delivery controller PDC1 detects the connection state (i.e. the first USB-C connector TYPEC_CON1 is connected to the power adapter ADP), the first switch SW1 would be switched to the ON state or the conducting state.

The first comparator circuit COMP1 is utilized to detect whether a voltage of the first power-receiving terminal CH1_IN is greater than a first voltage (the first voltage may be adjusted, for example, being adjusted into 18V). If the voltage of the first power-receiving terminal CH1_IN is greater than the first voltage, the first charging-discharging circuit CH1 would be enabled to charge the main system battery module BT1, and also to supply electricity to the main system circuit MS. If the voltage of the first power-receiving terminal CH1_IN is not greater than the first voltage, i.e. the voltage of first power-receiving terminal CH1_IN is less than 18V, the charging function of first charging-discharging circuit CH1 would be disabled, and the main system battery module BT1 would not be charged.

Explicitly speaking, as illustrated by the dotted lines in FIG. 4, the power adapter ADP is inserted into the first USB-C connector TYPEC_CON1, and the first switch SW1 is switched to the conducting state, such that the power adapter ADP may supply electricity to the main system 100, and generating the first converting voltage VC1 with 17V via the first power adapter CON1 (which does not have specific effects in this mode, and details thereof will be further described below). If the voltage generated by the power adapter ADP inserted is 20V, the first switch SW1 would be in the conducting state, such that the voltage of first power-receiving terminal CH1_IN would be greater than 18V, so as to further supply electricity to the main system circuit MS and the main system battery module BT1 as described above. Therefore, even when the voltage of power source PWR is insufficient (i.e. the voltage of power source PWR is less than 18V), although the main system battery module BT1 cannot be charged, the main system circuit MS may still normally work.

Figure 5:
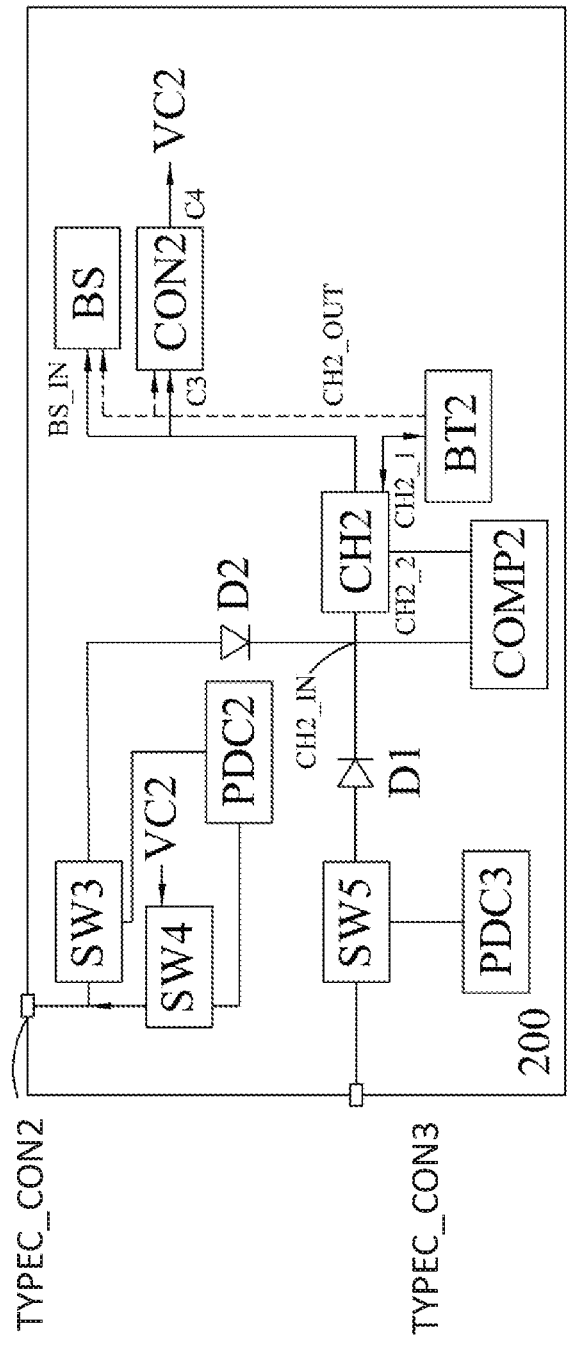
FIG. 5 is a schematic diagram showing the electricity supply path when in the secondary system battery discharging mode according to an embodiment of the present disclosure.

Please refer to FIG. 5, which is a schematic diagram showing the electricity supply path when in the secondary system battery discharging mode according to an embodiment of the present disclosure. When in the secondary system battery discharging mode, the first USB-C connector TYPEC_CON1 is not connected to the second USB-C connector TYPEC_CON2. The secondary system battery module BT2 may supply electricity to the second charging-discharging circuit CH2, and the second charging-discharging circuit CH2 would generate a secondary system supply voltage, so as to drive the secondary system circuit BS. In this mode, the secondary system battery module BT2 may supply electricity to the secondary system 200, and generating a second converting voltage VC2 with 17V via the second power adapter CON2 (details will be further described below). The electricity supply path of secondary system battery module BT2 is illustrated as the dotted lines in FIG. 5.

Figure 6:
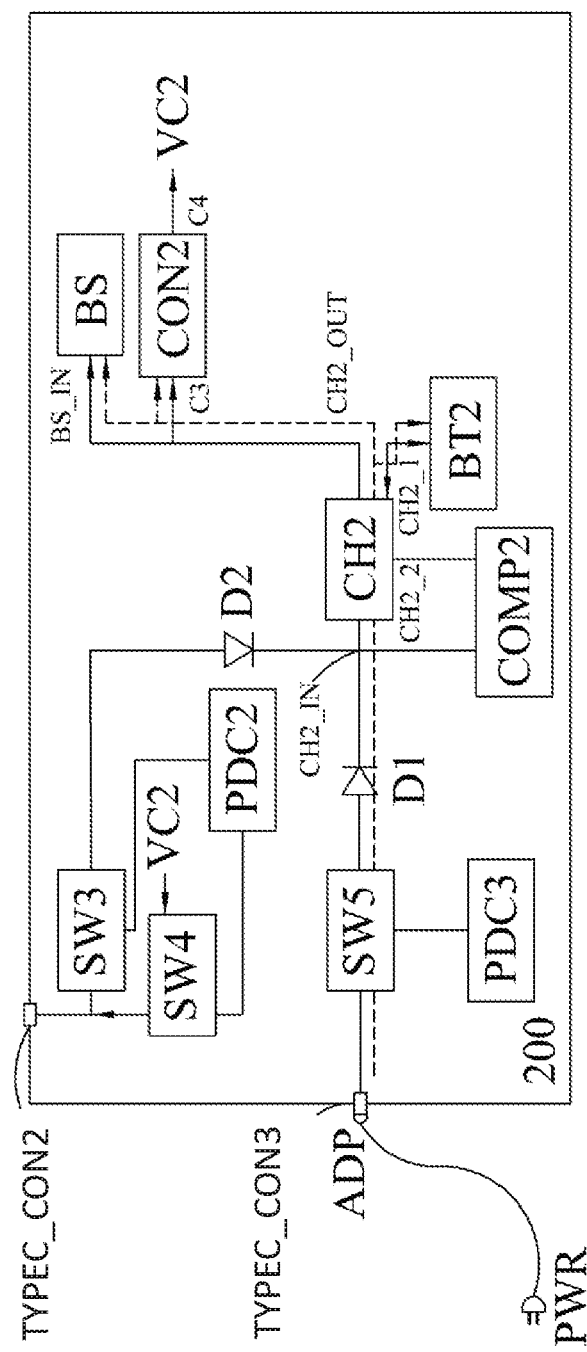
FIG. 6 is a schematic diagram showing the electricity supply path when in the secondary system battery charging mode according to an embodiment of the present disclosure.

Please refer to FIG. 6, which is a schematic diagram showing the electricity supply path when in the secondary system battery charging mode according to an embodiment of the present disclosure. When in the secondary system battery charging mode, the first USB-C connector TYPEC_CON1 is not connected to the second USB-C connector TYPEC_CON2, and the third USB-C connector TYPEC_CON3 is connected to the power adapter ADP of power source PWR. In the meantime, the third power delivery controller PDC3 detects the connection state, so as to switch the fifth switch SW5 to the ON state or the conducting state.

The second comparator circuit COMP2 is utilized to detect whether a voltage of the second power-receiving terminal CH2_IN is greater than the first voltage (for example, 18V). If the voltage of the second power-receiving terminal CH2_IN is greater than the first voltage, the second charging-discharging circuit CH2 would be enabled to charge the secondary system battery module BT2, and also to supply electricity to the secondary system circuit BS. In the meantime, the second converting voltage VC2 of second power adapter CON2 is 20V. Conversely, if the second comparator circuit COMP2 detects that the voltage of second power-receiving terminal CH2_IN is less than 18V, the second comparator circuit COMP2 would disable the charging function of second charging-discharging circuit CH2, and the secondary system battery module BT2 would not be charged. In the meantime, the second converting voltage VC2 of second power adapter CON2 is 17V. In other words, the second converting voltage VC2 of second power adapter CON2 would be output as 20V or 17V according to the comparing result conducted by the second comparator circuit COMP2.

More explicitly speaking, as illustrated by the dotted lines in FIG. 6, with the assumption that the power adapter ADP inserted into the power source PWR is 20V, the fifth switch SW5 may be conducted. In the meantime, the voltage of second power-receiving terminal CH2_IN is greater than 18V, so as to further charge the secondary system circuit BS and the secondary system battery module BT2 as described above. Therefore, even when the voltage of power source PWR is insufficient (i.e. the voltage of power source PWR is less than 18V), even though the secondary system battery module cannot be charged, the secondary system circuit may still work normally.

Figure 7:
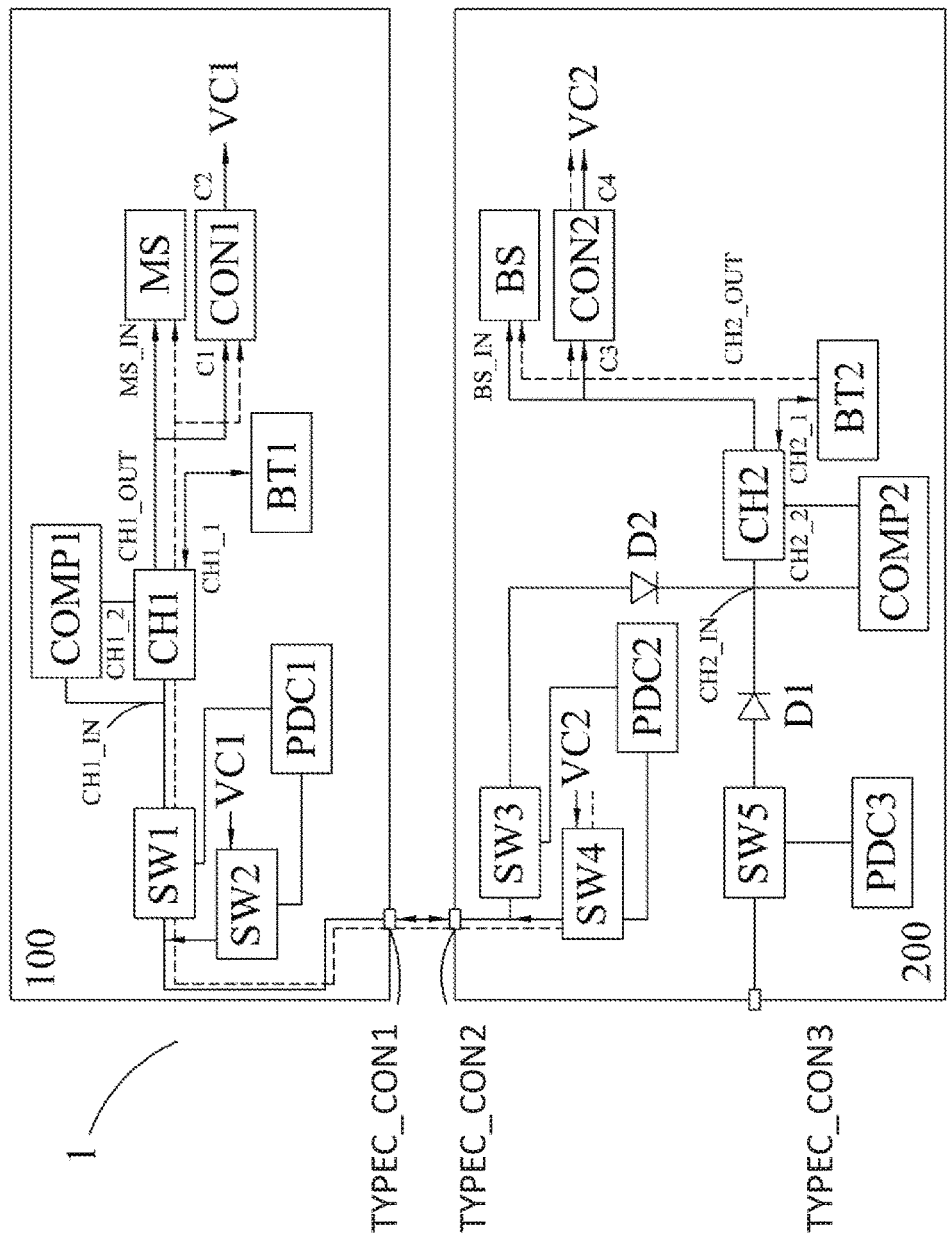
FIG. 7 is a schematic diagram showing the electricity supply path when in the connected state and secondary system battery discharging mode according to an embodiment of the present disclosure.
Figure 8:
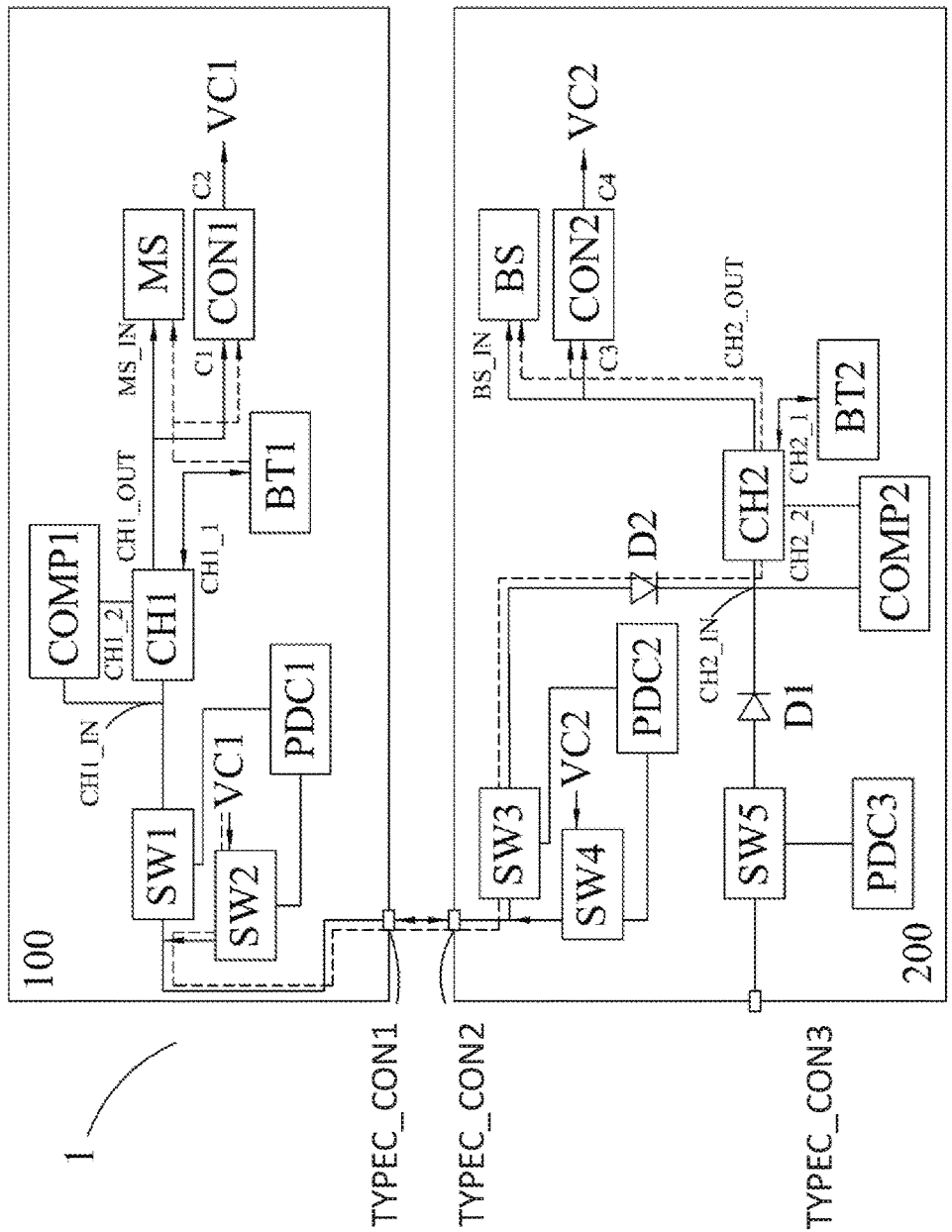
FIG. 8 is a schematic diagram showing the electricity supply path when in the connected state and main system battery discharging mode according to an embodiment of the present disclosure.

Please refer to FIG. 7 together with FIG. 8, which are respectively a schematic diagram showing the electricity supply path when in the connected state and secondary system battery discharging mode according to an embodiment of the present disclosure and a schematic diagram showing the electricity supply path when in the connected state and main system battery discharging mode according to an embodiment of the present disclosure. When in the secondary system battery discharging mode and connected state, the first USB-C connector TYPEC_CON1 and the second USB-C connector TYPEC_CON2 are connected. First of all, at beginning, the second power delivery controller PDC2 acts as a source end (power-supplying terminal), and the first power delivery controller PDC1 acts as a sink end (power-receiving terminal), wherein the source end is used as the UFP, which may utilize the feature of higher-efficiency power supply provided by USB-C, and a power supply protocol application is need to be proposed at this time. Sequentially, the sink end is used as the DFP, which may agree to the power supply application or offer the power of electricity supply which can be provided by it. Once the negotiation succeeds, the power supply protocol may correspondingly set up.

In the meantime, the secondary system battery module BT2 supply electricity to the secondary system circuit BS and the second power adapter CON2. If the second comparator circuit COMP2 detects that the voltage of second power-receiving terminal CH2_IN is less than the first voltage (for example, 18V), the second power adapter would be controlled to provide the second voltage (for example, 17V), which is less than the first voltage, to the second USB-C connector TYPEC_CON2, and supplying electricity to the first power-receiving terminal CH1_IN through a path in a sequence of the fourth switch SW4, the second USB-C connector TYPE_CON2, the first USB-C connector TYPEC_CON1, the first switch SW1 and the first charging-discharging circuit CH1. In the meantime, the first comparator circuit COMP1 detects that the voltage (about 17V) of first power-receiving terminal CH1_IN is less than the first voltage (18V), such that the first charging-discharging circuit CH1 would be controlled to supply electricity to the main system circuit MS via configurations (please refer to the illustration of FIG. 4), and the secondary system battery module BT2 would not be charged. The electricity supply path of secondary system battery module BT2 is illustrated as the dotted lines in FIG. 7.

Once the secondary system battery module BT2 continuously discharges till being less than the pre-setting electrical capacity, the main system battery discharging mode in the connected state will start. The second charging-discharging circuit CH2 may transform the second power delivery controller PDC2 into the sink end via detecting the voltage of secondary system battery module and transmitting signals to the second power delivery controller PDC2, such that the second power delivery controller PDC2 may inform the first power delivery controller PDC1 so as to transform it into the source end.

After the transforming described above is completed, the main system battery module BT1 will start to supply electricity to the main system circuit MS and the first power adapter CON1. The first power adapter CON1 may generate the first converting voltage VC2 with 17V, and supplying electricity to the secondary system circuit BS through a path in a sequence of the second switch SW2 (which may be switched on by the first power delivery controller PDC1 according to the power supply protocol application), the first USB-C connector TYPEC_CON1, the second USB-C connector TYPEC_CON2, the third switch SW3 (which may be switched on by the second power delivery controller PDC2), the second diode D2 and the second charging-discharging circuit CH2, as illustrated by the dotted lines. At this moment, the second comparator circuit COMP2 detects that the voltage (about 17V) of second power-receiving terminal CH2_IN is also less than 18V, and thus, the secondary system battery module BT2 will not be charged. The electricity supply path of main system battery module BT1 is illustrated as the dotted lines in FIG. 8.

On a basis of the judgment conditions of the first comparator circuit COMP1 and the second comparator circuit COMP2 described above in combination with the transmitting mechanism of the first power delivery controller PDC1 and the second power delivery controller PDC2, it may be achieved that, when in the battery discharging mode, the main system battery module BT1 and the secondary system battery module BT2 may not charge each other, and the discharging order of the main system battery module BT1 and the secondary system battery module BT2 may be controlled.

Figure 9:
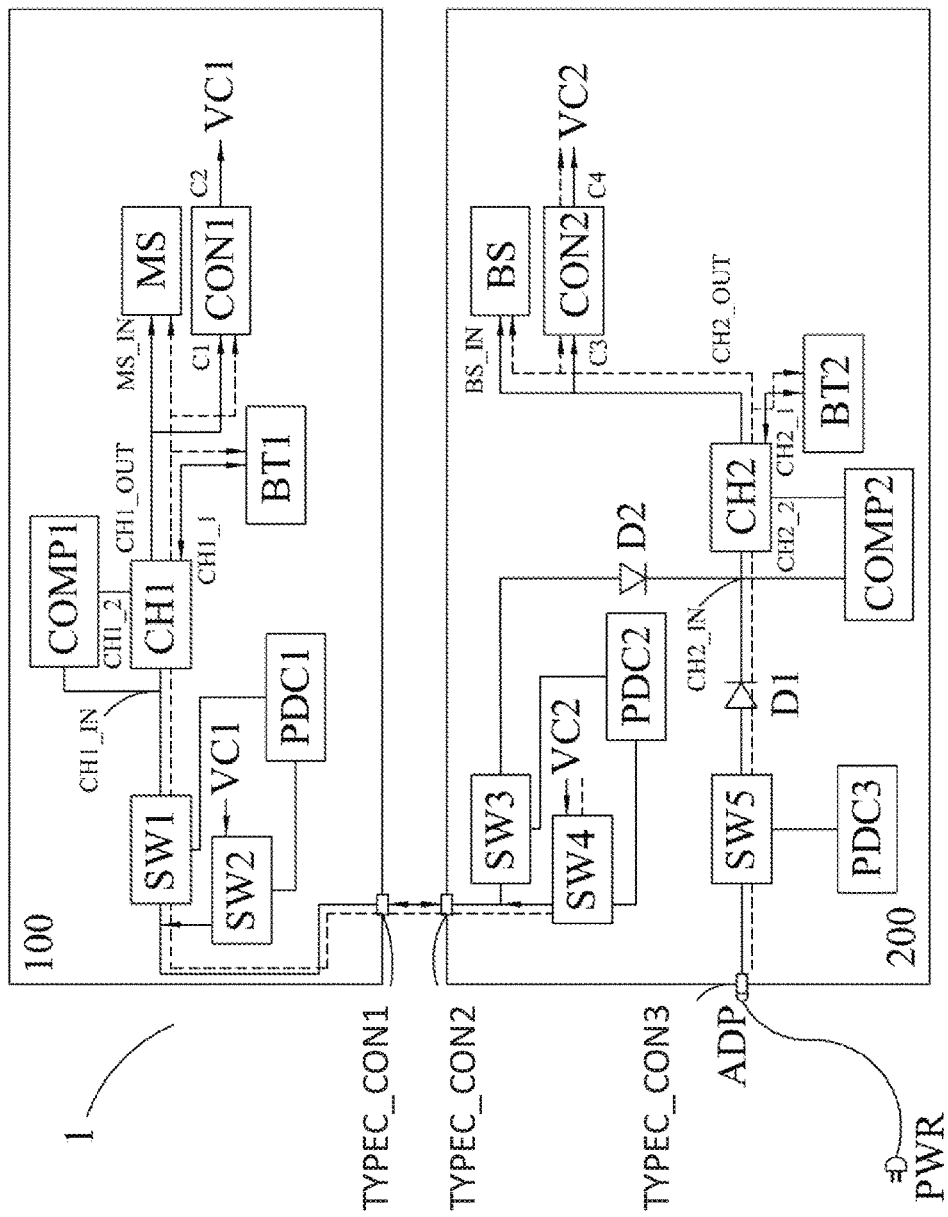
FIG. 9 is a schematic diagram showing the electricity supply path when in the connected state and charging mode according to an embodiment of the present disclosure.

Please refer to FIG. 9, which is a schematic diagram showing the electricity supply path when in the connected state and charging mode according to an embodiment of the present disclosure. When in the charging mode and connected state, the first USB-C connector TYPEC_CON1 is connected to the second USB-C connector TYPEC_CON2, and the third USB-C connector TYPEC_CON3 is connected to the power adapter ADP of power source PWR. The second comparator circuit COMP2 detects whether the voltage of second power-receiving terminal CH2_IN is greater than the first voltage. If the voltage of second power-receiving terminal CH2_IN is greater than the first voltage, the second charging-discharging circuit CH2 would be controlled to charge the secondary system battery module BT2 and supply electricity to the secondary system circuit BS, and furthermore, the second power adapter CON2 would be controlled to provide the third voltage which is greater than the first voltage to the second USB-C connector TYPEC_CON2 and supply electricity to the first power-receiving terminal CH1_IN via the first switch SW1. Besides, the first comparator circuit COMP1 detects that the voltage of first power-receiving terminal CH1_IN is greater than the first voltage, such that the first charging-discharging circuit CH1 is controlled to supply electricity to the main system circuit MS via configurations, and the main system battery module BT1 is charged.

Explicitly speaking, after the power adapter ADP which provides the 20V voltage is inserted into the third USB-C connector TYPEC_CON3, since the voltage of second power-receiving terminal CH2_IN is greater than 18V, the charging function of second charging-discharging circuit CH2 would be enabled, so as to make the secondary system battery module BT2 charged. The second power adapter may generate the second converting voltage VC2 with 20V (the third voltage), and supplying electricity to the main system circuit MS through a path in a sequence of the fourth switch SW4, the second USB-C connector TYPEC_CON2, the first USB-C connector TYPEC_CON1, the first switch SW1 and the first charging-discharging circuit CH1. In the meantime, the first comparator circuit COMP1 detects that the voltage of first power-receiving terminal CH1_IN is also greater than 18V, such that the charging function of first charging-discharging circuit CH1 would be enabled, so as to make the main system battery module BT1 charged. The electricity supply path from the power adapter ADP to the main system battery module BT1, the secondary system battery module BT2, the main system circuit MS and the secondary system circuit is illustrated as the dotted lines in FIG. 9.

In conclusion, the two way charging-discharging circuit structure of the present disclosure adopts the USB-C connector, wherein the first power delivery controller PDC1 and second power delivery controller PDC2 with the DRP act as the connection interface of the main system 100 and the secondary system 200, so that there is no need to customize new connectors to connect the two systems. The DRP-type power delivery controller may make the USB-C connector act as the power-supplying terminal or the power-receiving terminal, so as to control the discharging order of the main system battery module BT1 and the secondary system battery module BT2.

Due to the judgment conditions of the first comparator circuit COMP1 and the second comparator circuit COMP2 in combination with the transmitting mechanism of the first power delivery controller PDC1 and the second power delivery controller PDC2, it may be achieved that, when in the battery discharging mode, the main system battery module BT1 and the secondary system battery module BT2 may not charge each other, and the discharging order of the main system battery module BT1 and the secondary system battery module BT2 may also be controlled. Besides, when in the charging mode, if the power from the power adapter ADP is sufficient, the main system battery module BT1 and the secondary system battery module BT2 may simultaneously be charged. On the contrary, if the power from the power adapter ADP is insufficient, it may be achieved to charge the main system battery module BT1 in advance and then charge the secondary system battery module BT2 via the dynamic power management setting of the first charging-discharging module CH1 and the second charging-discharging module CH2.

In accordance with the two way charging-discharging circuit structure provided in the present disclosure, which has the following advantages:

1. Due to the usage of USB-C connectors to connect the main system and the secondary system, customizing new connectors is not necessary so as to reduce the cost.

2. The two way charging-discharging circuit structure may control the discharging order of batteries when in the connected state, and the main or secondary system battery discharging mode, and the to-be-discharging battery will not be charged.

3. When the two way charging-discharging circuit structure is in a battery charging mode, the battery modules of the main system and secondary system may be charged simultaneously if the power from the power adapter is sufficient. On the other hand, the charging priority of main system battery module is higher than that of secondary system battery module if the power from the power adapter is insufficient.

Due to the descriptions above pertaining to the present disclosure, a person skilled in the art may practice the present invention. Moreover, a person skilled in the art may effortlessly understand each of various possible modifications and additions that can be made to the present disclosure. The general principles defined in the text may also be employed to produce other alternative implementations without departing from the spirit and scope defined by the present disclosure and set forth in the appended claims. As a result, the present disclosure is not merely confined by the exemplified embodiments and designs described in the text, but is supposed to encompass the widest scope consistent with the principles and new features described in the text.

What is claimed is:

1. A two way charging-discharging circuit structure, comprising:
   a main system, comprising:
      a main system circuit, comprising a main system power-receiving terminal;
      a first charging-discharging circuit, comprising a first power-supplying terminal, a first power-receiving terminal, a first control terminal and a first charging-discharging terminal, and the first power-supplying terminal being connected to the main system power-receiving terminal;
      a main system battery module, connected to the first power-supplying terminal;
      a first USB-C connector, connected to the first power-receiving terminal via a first power delivery controller circuit;
      a first power adapter, comprising a first terminal and a second terminal, and the first terminal being connected to the first power-supplying terminal, and the second terminal being connected to the first power delivery controller circuit; and
      a first comparator circuit, connected between the first power-receiving terminal and the first control terminal; and
   a secondary system, comprising:
      a secondary system circuit, comprising a secondary system power-receiving terminal;
      a second charging-discharging circuit, comprising a second power-supplying terminal, a second power-receiving terminal, a second control terminal and a second charging-discharging terminal, and the second power-supplying terminal being connected to the secondary system power-receiving terminal;
      a secondary system battery module, connected to the second charging-discharging terminal;
      a second USB-C connector, connected to the second power-receiving terminal via a second power delivery controller circuit;
      a third USB-C connector, connected to the second power-receiving terminal via a third power delivery controller circuit;
      a second power adapter, comprising a third terminal and a fourth terminal, and the third terminal being connected to the second power-supplying terminal, and the fourth terminal being connected to the second power delivery controller circuit; and
      a second comparator circuit, connected between the second power-receiving terminal and the second control terminal,
   wherein the first USB-C connector is selectively connected to the second USB-C connector, and when connected, the two way charging-discharging circuit structure is in a connected state.

2. The two way charging-discharging circuit structure according to claim 1, wherein in a main system battery discharging mode, the first USB-C connector is not connected to the second USB-C connector, the main system battery module supplies electricity to the first charging-discharging circuit, and the first charging-discharging circuit generates a main system supply voltage so as to drive the main system circuit.

3. The two way charging-discharging circuit structure according to claim 1, wherein in a main system battery charging mode, the first USB-C connector is not connected to the second USB-C connector, and when the first USB-C connector is connected to a power adapter of a power source, the first comparator circuit detects whether a voltage of the first power-receiving terminal is greater than a first voltage or not, and if the voltage of the first power-receiving terminal is greater than the first voltage, the first charging-discharging circuit is controlled to charge the main system battery module, and electricity is supplied to the main system circuit.

4. The two way charging-discharging circuit structure according to claim 1, wherein in a secondary system battery discharging mode, the first USB-C connector is not connected to the second USB-C connector, the secondary system battery module supplies electricity to the second charging-discharging circuit, and the second charging-discharging circuit generates a secondary system supply voltage so as to drive the secondary system circuit.

5. The two way charging-discharging circuit structure according to claim 1, wherein in a secondary system battery charging mode, the first USB-C connector is not connected to the second USB-C connector, when the third USB-C connector is connected to a power adapter of a power source, the second comparator circuit detects whether a voltage of the second power-receiving terminal is greater than a first voltage or not, and if the voltage of the second power-receiving terminal is greater than the first voltage, then the second charging-discharging circuit is controlled to charge the secondary system battery module, and electricity is supplied to the secondary system circuit.

6. The two way charging-discharging circuit structure according to claim 1, wherein the first USB-C connector is connected to the second USB-C connector, the first power delivery controller circuit and the second power delivery controller circuit are in communication and respectively configured as a power-receiving terminal and a power-supplying terminal.

7. The two way charging-discharging circuit structure according to claim 6, wherein in a secondary system battery discharging mode and in the connected state, the secondary system battery module supplies electricity to the secondary system circuit and the second power adapter, and if the second comparator circuit detects that a voltage of the second power-receiving terminal is smaller than a first voltage, the second charging-discharging circuit is controlled to supply electricity to the secondary system circuit, the second power adapter is controlled to provide a second voltage which is less than the first voltage to the second USB-C connector, and electricity is supplied to the first power-receiving terminal via the first power delivery controller circuit; and if the first comparator circuit detects that a voltage of the first power-receiving terminal is smaller than the first voltage, the first charging-discharging circuit is configured to be controlled to supply electricity to the main system circuit.

8. The two way charging-discharging circuit structure according to claim 6, wherein in a main system battery discharging mode and in the connected state, the first power delivery controller circuit is configured as the power-supplying terminal, the second power delivery controller circuit is configured as the power-receiving terminal, the main system battery module supplies electricity to the main system circuit and the first power adapter, and if the first comparator circuit detects that a voltage of the first power-receiving terminal is smaller than a first voltage, the first charging-discharging circuit is controlled to supply electricity to the main system circuit, the first power adapter is controlled to provide a second voltage which is less than the first voltage to the first USB-C connector, and electricity is supplied to the second power-receiving terminal via the second power delivery controller circuit; and if the second comparator circuit detects that a voltage of the second power-receiving terminal is smaller than the first voltage, the second charging-discharging circuit is configured to be controlled to supply electricity to the secondary system circuit.

9. The two way charging-discharging circuit structure according to claim 1, wherein in a charging mode and in the connected state, the first USB-C connector is connected to the second USB-C connector, the third USB-C connector is connected to a power adapter of a power source, the second comparator circuit detects whether a voltage of the second power-receiving terminal is greater than a first voltage or not, and if the voltage of the second power-receiving terminal is greater than the first voltage, the second charging-discharging circuit is controlled to charge the secondary system battery module, electricity is supplied to the secondary system circuit, the second power adapter is controlled to provide a third voltage which is greater than the first voltage to the second USB-C connector, and electricity is supplied to the first power-receiving terminal via the first power delivery controller circuit; and if the first comparator circuit detects that a voltage of the first power-receiving terminal is greater than the first voltage, the first charging-discharging circuit is configured to be controlled to supply electricity to the main system circuit, and the main system battery module is charged.

10. The two way charging-discharging circuit structure according to claim 1, wherein the first power delivery controller circuit and the second power delivery controller circuit respectively comprise at least two switch devices and a DRP (dual-role port)-type power delivery controller, and the third power delivery controller circuit comprises at least one switch device and a UFP (upstream-facing port)-type power delivery controller.

* * * * *